United States Patent
Furubayashi

(10) Patent No.: US 10,668,680 B2
(45) Date of Patent: Jun. 2, 2020

(54) DEVICE AND METHOD FOR MANUFACTURING CYLINDRICAL MEMBER

(71) Applicant: The Yokohama Rubber Co., LTD., Minato-ku, Tokyo (JP)

(72) Inventor: Yuki Furubayashi, Shinshiro (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 16/333,978

(22) PCT Filed: Sep. 1, 2017

(86) PCT No.: PCT/JP2017/031545
§ 371 (c)(1),
(2) Date: Mar. 15, 2019

(87) PCT Pub. No.: WO2018/051813
PCT Pub. Date: Mar. 22, 2018

(65) Prior Publication Data
US 2019/0248085 A1    Aug. 15, 2019

(30) Foreign Application Priority Data
Sep. 16, 2016 (JP) .................. 2016-181591

(51) Int. Cl.
*B29D 30/26* (2006.01)
*B29D 30/24* (2006.01)

(52) U.S. Cl.
CPC .......... *B29D 30/244* (2013.01); *B29D 30/26* (2013.01); *B29D 2030/2685* (2013.01)

(58) Field of Classification Search
CPC .... B29D 30/26; B29D 30/3007; B29D 30/58; B29D 2030/2685; B29D 2030/4487
See application file for complete search history.

(56) References Cited

U.S. PATENT DOCUMENTS

| 1,270,380 | A | * | 6/1918 | Converse | B29D 30/08 156/130 |
| 3,251,722 | A | * | 5/1966 | Holman | B29D 30/60 156/130 |

(Continued)

FOREIGN PATENT DOCUMENTS

| JP | 60-219038 A | * 11/1985 |
| JP | H02-092527 | 4/1990 |

(Continued)

OTHER PUBLICATIONS

International Search Report for International Application No. PCT/JP2017/031545 dated Dec. 5, 2017, 4 pages, Japan.

*Primary Examiner* — Geoffrey L Knable
(74) *Attorney, Agent, or Firm* — Thorpe North & Western

(57) ABSTRACT

A device and method are provided for manufacturing a cylindrical member. By inserting an edge of the forming drum on one side in a width direction between an arm and a projection of a holding unit disposed opposite one another and bringing the arm and the projection closer together in a direction in which a separation distance is reduced, a first end of the rubber member disposed on the outer circumferential surface of the forming drum is disposed between the arm and the projection, pressed by the arm, and held on the outer circumferential surface, and a holding unit attached to the forming drum is rotated about a drum shaft together with the forming drum; and the rubber member is wound around the outer circumferential surface and formed into a cylindrical shape.

9 Claims, 9 Drawing Sheets

(56) References Cited

U.S. PATENT DOCUMENTS 4,983,243 A     1/1991   Nakano et al.
5,080,738 A *   1/1992   Araki ..................... B29D 30/48
                                                                                  156/132

FOREIGN PATENT DOCUMENTS

| JP | H03-190725 | 8/1991 |
| JP | H04-104433 | 9/1992 |
| JP | H06-340006 | 12/1994 |
| JP | H07-178847 | 7/1995 |
| JP | 2010-208110 | 9/2010 |
| JP | 2011-518691 | 6/2011 |
| JP | 2012-040797 | 3/2012 |
| WO | WO 2009/131451 | 10/2009 |

* cited by examiner

DEVICE AND METHOD FOR MANUFACTURING CYLINDRICAL MEMBER

TECHNICAL FIELD

The present technology relates to a device and method for manufacturing a cylindrical member and particularly relates to a device and method for manufacturing a cylindrical member with high versatility in which, when winding a band-like rubber member and forming the band-like rubber member into a cylindrical shape, a first end portion corresponding to a winding starting point of the band-like rubber member can be securely fixed to an outer circumferential surface of a forming drum at a predetermined position.

BACKGROUND ART

In the tire manufacturing process, various cylindrical members such as a tread rubber, a side rubber, and the like are manufactured using an unvulcanized band-like rubber member. In manufacturing these cylindrical members, for example, a band-like rubber member is wound around the outer circumferential surface of a forming drum and formed into a cylindrical shape. At this time, a method may be used that includes adhering/holding and fixing an end portion of the band-like rubber member that corresponds to a winding starting point with an adhesion pad embedded in the outer circumferential surface of the forming drum. However, the adhesion pad may be unable to be installed depending on the specifications of the forming drum.

As another way of winding a band-like rubber member around an outer circumferential surface of a forming drum, a holding device has been proposed in which a slender fixing member including a magnet at both ends that is detachable from the forming drum by magnetic force (see Japan Unexamined Patent Publication No. 2011-518691, paragraphs 0018 and 0019 and FIGS. 4 and 5). In this holding device, an end portion of the band-like rubber member is sandwiched and held between the fixing member attached to the forming drum and the outer circumferential surface of the forming drum. The fixing member rotates together with the forming drum while attached to the forming drum. The fixing member (holding device) is a separate member from the forming drum, thus it can be used for various forming drums. However, there is room for improvement, because the fixing member is attached to the forming drum via magnetic force, the band-like rubber member cannot be firmly fixed to the outer circumferential surface of the forming drum.

SUMMARY

The present technology provides a device and method for manufacturing a cylindrical member with high versatility in which, when winding a band-like rubber member and forming the band-like rubber member into a cylindrical shape, a first end portion corresponding to a winding starting point of the band-like rubber member can be securely fixed to an outer circumferential surface of a forming drum at a predetermined position.

A device for manufacturing a cylindrical member according to an embodiment of the present technology includes:

a forming drum including an outer circumferential surface around which an unvulcanized band-like rubber member is wound; and a holder including a holding unit, the holding unit holding a first end portion of the band-like rubber member that corresponds to a winding starting point on the outer circumferential surface and is detachable from the forming drum; wherein the holding unit includes an arm and a projection portion disposed opposite one another and an approach mechanism that brings the arm and the projection portion closer together;

when the holding unit is attached to the forming drum, an edge portion of the forming drum on one side in a width direction is inserted between the arm and the projection portion, the first end portion disposed on the outer circumferential surface is disposed between the arm and the projection portion brought closer together in a direction in which a separation distance is reduced, and the first end portion is pressed by the arm and held on the outer circumferential surface; and the holding unit is rotatable about a drum shaft together with the forming drum.

A method for manufacturing a cylindrical member according to an embodiment of the present technology includes:

holding a first end portion of an unvulcanized band-like rubber member corresponding to a winding starting point on an outer circumferential surface of a forming drum by attaching a holding unit to the forming drum, the holding unit being detachable from the forming drum; and winding the band-like rubber member around the outer circumferential surface and forming the band-like rubber member into a cylindrical shape by rotating the forming drum, with the first end portion held; wherein by inserting an edge portion of the forming drum on one side in a width direction between an arm and a projection portion of the holding unit disposed opposite one another and by bringing the arm and the projection portion closer together in a direction in which a separation distance is reduced, the first end portion disposed on the outer circumferential surface is pressed by the arm and held on the outer circumferential surface, and the holding unit is attached to the forming drum; and the holding unit is rotated about a drum shaft together with the forming drum.

According to the present technology, the edge portion of the forming drum on one side in the drum width direction is inserted between the arm and the projection portion of the holding unit detachable from the forming drum, and the first end portion of the band-like rubber member disposed on the outer circumferential surface of the forming drum is disposed between the arm and the projection portion brought closer together in the direction in which the separation distance is reduced. In this way, the holding unit is attached to the forming drum, and the first end portion of the band-like rubber member is pressed by the arm and held on the outer circumferential surface of the forming drum. Accordingly, even for forming drums having different specifications, the first end portion of the band-like rubber member can be securely fixed on the outer circumferential surface of the forming drum at a predetermined position by the holding unit.

In the process of rotating the forming drum and winding the band-like rubber member around the outer circumferential surface, the holding unit attached to the forming drum constantly holds and fixes the first end portion of the band-like rubber member disposed on the outer circumferential surface to the outer circumferential surface at a predetermined position. Accordingly, high versatility is achieved by being able to suppress the deviation of the band-like rubber member and form the band-like rubber member into a cylindrical member for forming drums of various types.

DETAILED DESCRIPTION

Figure 1:
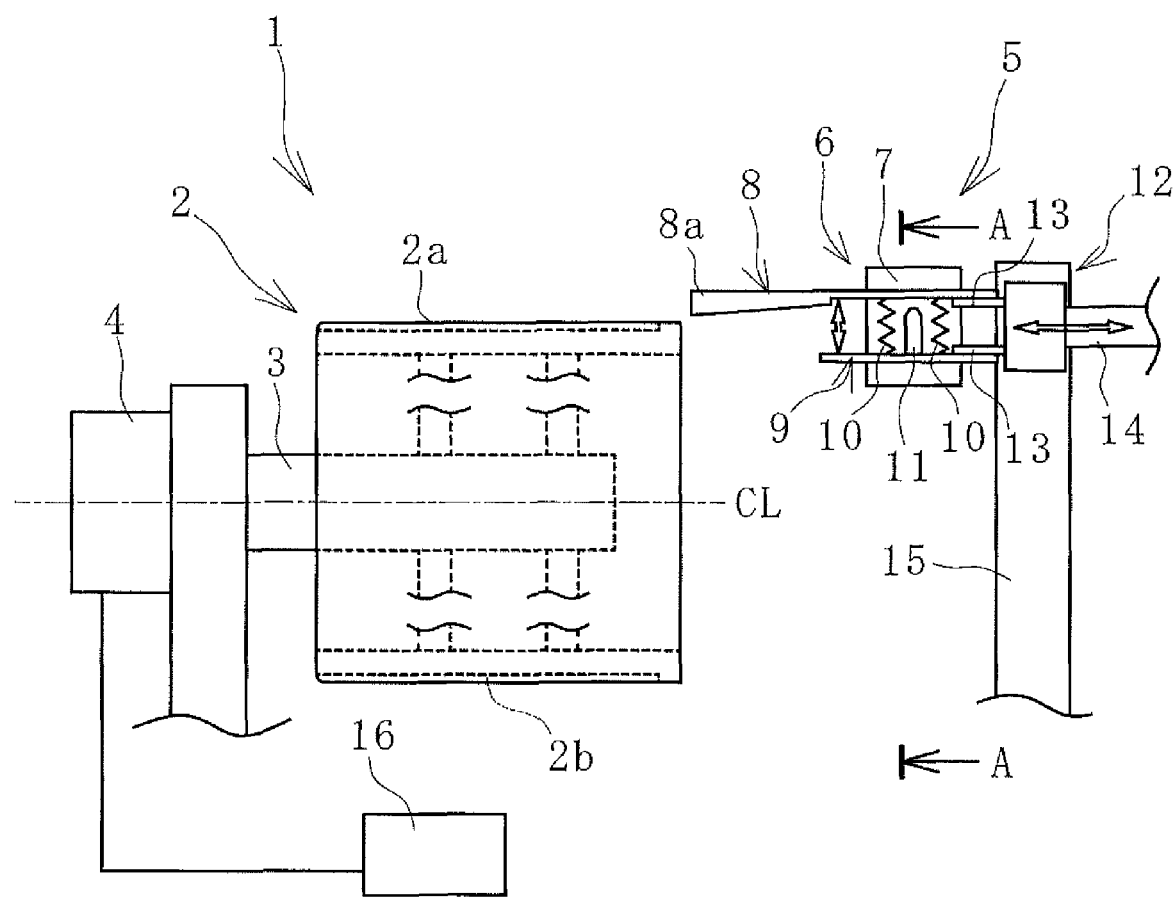
FIG. 1 is an explanatory diagram illustrating a front view of a device for manufacturing a cylindrical member according to an embodiment of the present technology.

Hereinafter, a device and method for manufacturing a cylindrical member of the present technology will be specifically described based on embodiments illustrated in the drawings.

Figure 2:
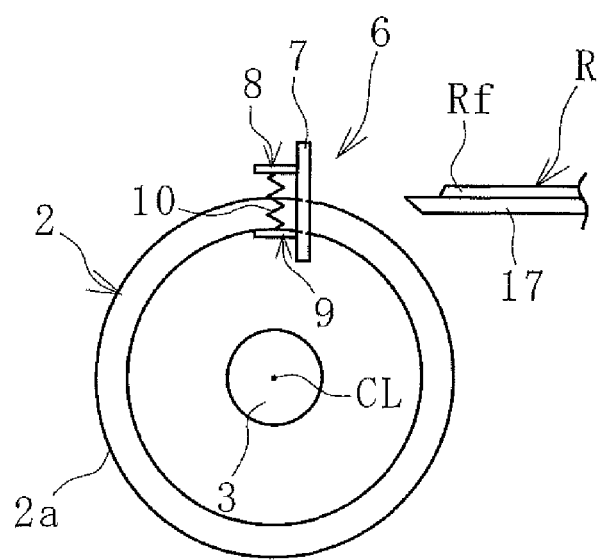
FIG. 2 is an explanatory diagram illustrating the manufacturing device of FIG. 1 viewed in the direction of the arrows A-A.
Figure 7:
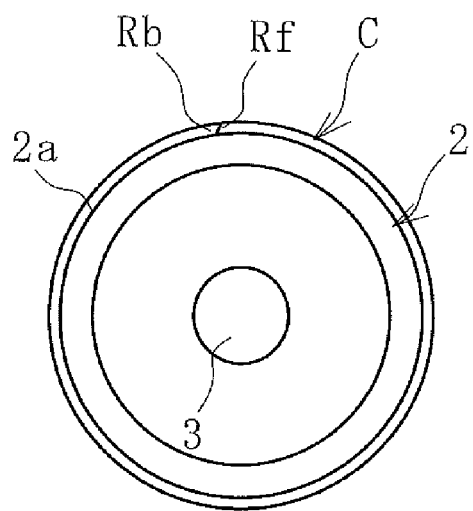
FIG. 7 is an explanatory diagram illustrating a cylindrical member formed on the forming drum in a side view.

A device 1 for manufacturing a cylindrical member (hereinafter, referred to as a manufacturing device 1) according to an embodiment of the present technology illustrated in FIGS. 1 and 2 is provided with a forming drum 2 and a holder 5. The manufacturing device 1 forms an unvulcanized band-like rubber member R into a cylindrical member C as illustrated in FIG. 7. Examples of the cylindrical member C include a tire tread rubber, a side rubber, and various members used in the manufacture of a tire and other rubber products.

The forming drum 2 is a cylindrical body including a drum shaft 3 and is cantilevered by a frame or the like. At least a portion of the forming drum 2 can be expanded and contracted in the radial direction. One end portion of the drum shaft 3 is connected to a drum shaft drive motor 4 for rotationally driving the drum shaft 3. In other words, the drum shaft 3 is a drive shaft that rotates and drives. Note that the dot-dash line CL in the drawings represents the axial center position of the drum shaft 3.

In this embodiment, the forming drum 2 includes an expanding shaping bladder 2b on an outer circumferential surface 2a of the forming drum 2. Generally, as illustrated in FIG. 1, the shaping bladder 2b is in an uninflated state, and when necessary, air is injected into the interior to expand the shaping bladder 2b radially outward.

The actuation of the drum shaft drive motor 4 is controlled by a control unit 16. Accordingly, the rotation, stopping of the rotation, and rotational speed (rotational angular velocity) of the forming drum 2 are controlled by the control unit 16.

The holder 5 is provided separately from the forming drum 2 as a separate body. The holder 5 includes a holding unit 6 and a removal/attachment unit 12.

The holding unit 6 is configured to be detachable from the forming drum 2. The holding unit 6 includes a base 7, an arm 8 and a projection portion 9 disposed opposite one another on the base 7, an approach mechanism 10, and a stopper 11. The base 7 is a plate-like body or a frame structure.

The arm 8 and the projection portion 9 are members that project toward the forming drum 2 from the base 7 and are disposed vertically separated from one another. The arm 8 and/or the projection portion 9 is slidable in the vertical direction along to the base 7. Thus, only the arm 8, only the projection portion 9, or the arm 8 and the projection portion 9 can be slidably disposed. The arm 8 is longer than the projection portion 9; however, they may have the same length.

The approach mechanism 10 slides and moves the arm 8 and/or the projection portion 9 closer together in a direction in which the separation distance is reduced. As the approach mechanism 10, for example, a biasing member, such as a spring or an elastic rubber; or an actuator, such as an air cylinder or a hydraulic cylinder may be used.

The stopper 11 is disposed between the arm 8 and the projection portion 9. When the arm 8 and the projection portion 9 are brought closer together to a preset minimum separation distance, the arm 8 and the projection portion 9 come into contact with and sandwich the stopper 11. Accordingly, the arm 8 and the projection portion 9 cannot be brought together any closer, ensuring the minimum separation distance.

The removal/attachment unit 12 is installed separated from the forming drum 2 in the drum width direction. The removal/attachment unit 12 includes a supporting column 15 erected in the ground, an advancing/withdrawing mechanism 14 provided on the supporting column 15 that extends in the horizontal direction, and an engagement portion 13 that advances toward or withdraws from the forming drum 2 via the advancing/withdrawing mechanism 14.

As the advancing/withdrawing mechanism 14, for example, an air cylinder or hydraulic cylinder that advances or withdraws a rod with fluid pressure; or a servo mechanism that advances or withdraws via a servo motor can be used. The engagement portion 13 is attached to an end portion of the advancing/withdrawing rod.

The structure of the engagement portion 13 is not limited as long as the engagement portion 13 can engage with the holding unit 6 in a detachable manner. The engagement portion 13 of this embodiment includes two plate-like bodies disposed opposite one another and vertically separated. The engagement portions 13 are movable in a direction in which the vertical gap between the two change. The engagement portions 13 are moved and inserted between the arm 8 and the projection portion 9 by the advancing/withdrawing mechanism 14 and are moved in a direction away from one another, resisting the force from the approach mechanism 10 that brings the arm 8 and the projection portion 9 closer together. By engaging the arm 8, the projection portion 9, and the engagement portions 13 in this manner, the engagement portions 13 and the holding unit 6 are engaged. To release the engagement of the engagement portions 13 and the holding unit 6, the engagement portions 13 are moved in a direction toward one another, and the arm 8, the projection portion 9, and the engagement portion 13 are disengaged.

Then, the engagement portions 13 are moved by the advancing/withdrawing mechanism 14 and removed from between the arm 8 and the projection portion 9.

The steps of a method for manufacturing a cylindrical member according to an embodiment of the present technology will be described below.

As illustrated in FIG. 2, the band-like rubber member R is placed in a flat state and conveyed and supplied by a member supplier 17 starting with a first end portion Rf. At this time, the drum shaft 3 is in a non-rotating state. The holding unit 6 is held by the removal/attachment unit 12 at a standby position (the position illustrated in FIG. 1) away from the forming drum 2.

Figure 3:
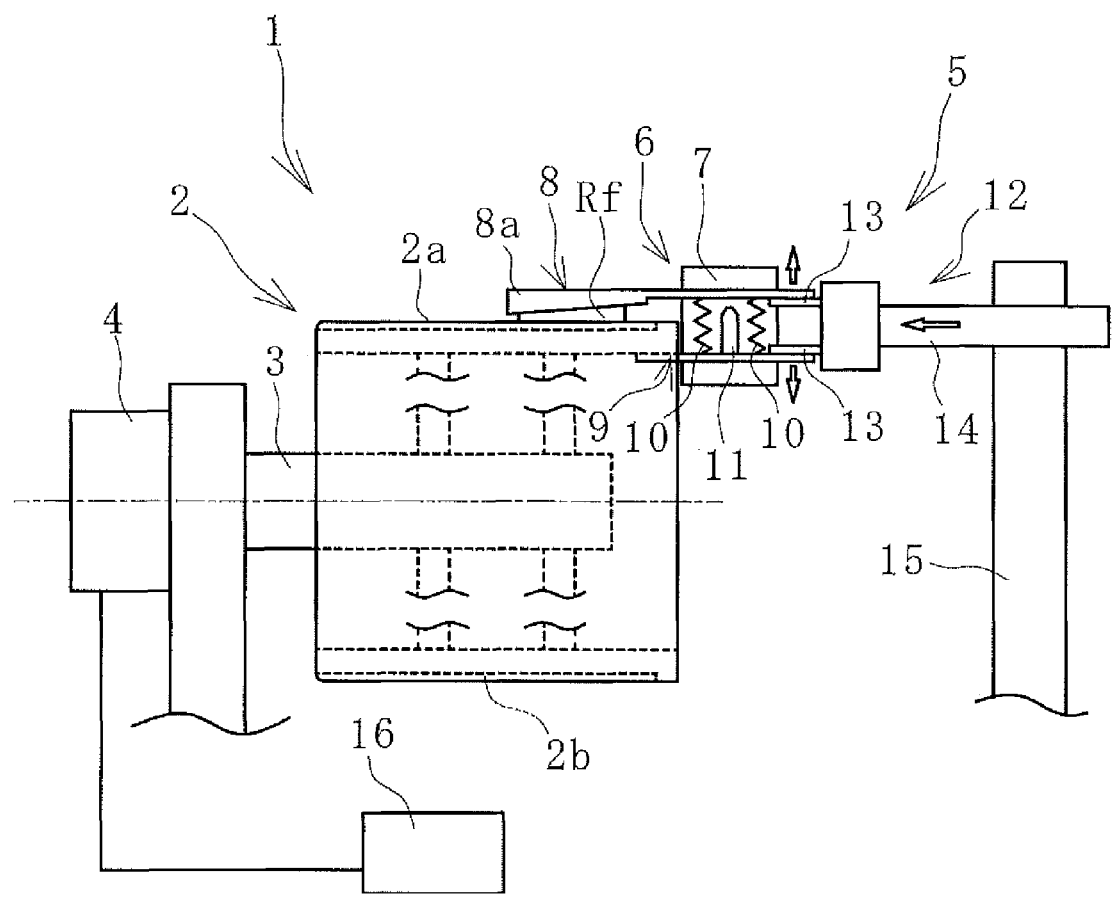
FIG. 3 is an explanatory diagram illustrating a process of attaching the holding unit illustrated in FIG. 1 to a forming drum in a front view.

The first end portion Rf of the supplied band-like rubber member R is disposed on the outer circumferential surface 2a of the forming drum 2. The first end portion Rf corresponds to the winding starting point of the band-like rubber member R on the forming drum 2. The band-like rubber member R is disposed on the outer circumferential surface 2a, then the holding unit 6 is moved toward the forming drum 2 by the advancing/withdrawing mechanism 14, as illustrated in FIG. 3. At this time, the engagement portions 13 are moved in the direction away from one another to sufficiently make space between the arm 8 and the projection portion 9, and an edge portion of the forming drum 2 on one side in the width direction is inserted into the space.

Figure 4:
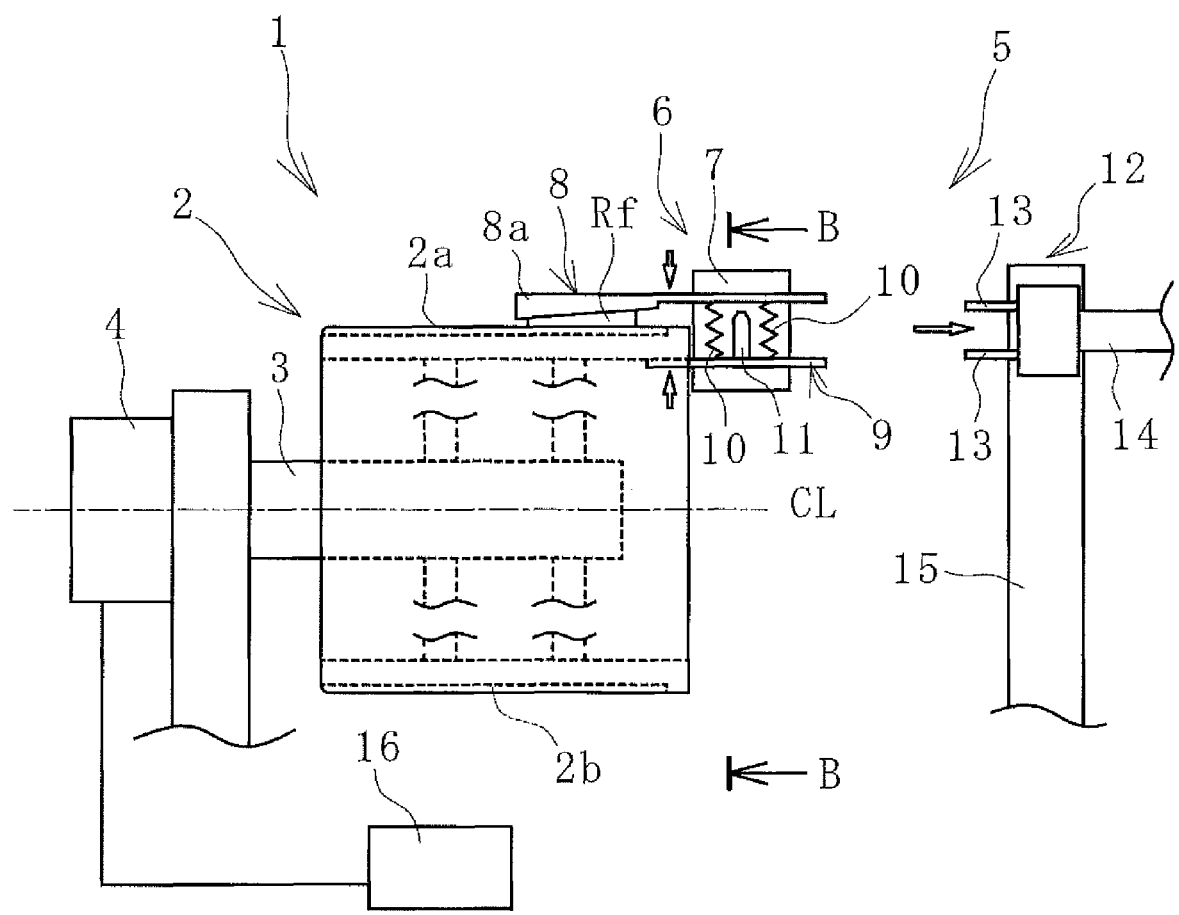
FIG. 4 is an explanatory diagram illustrating a front view of a winding starting point of a band-like rubber member being held and fixed to the outer circumferential surface of the forming drum by the holding unit illustrated in FIG. 1.
Figure 5:
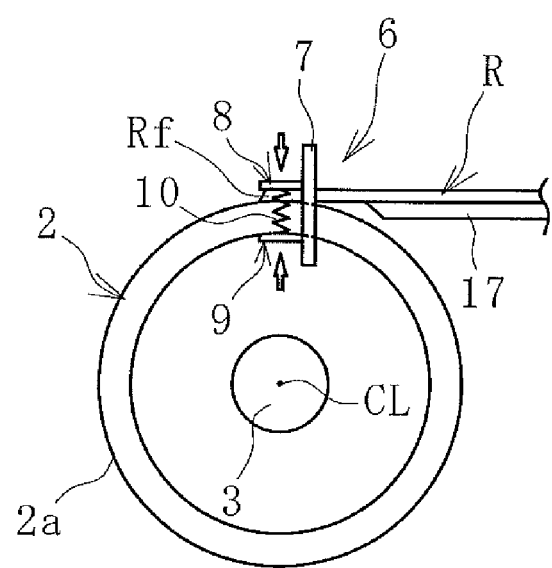
FIG. 5 is an explanatory diagram illustrating the manufacturing device of FIG. 4 viewed in the direction of the arrows B-B.

Next, the engagement portions 13 are moved in the direction toward one another, and the arm 8 and the projection portion 9 are brought closer to one another by the approach mechanism 10 in the direction in which the separation distance is reduced, as illustrated in FIGS. 4 and 5. In this way, a first end portion Rf disposed on the outer circumferential surface 2a between the arm 8 and the projection portion 9 is held and fixed on the outer circumferential surface 2a at a predetermined position by being pressed by an end portion 8a of the arm 8. The first end portion Rf is held between the arm 8 and the projection portion 9 actively brought closer to one another by the approach mechanism 10, and thus is firmly held and fixed on the outer circumferential surface 2a. The engagement portions 13 are withdrawn by the advancing/withdrawing mechanism 14, moved away from the forming drum 2, and removed from the holding unit 6, and the holding unit 6 is attached to the forming drum 2.

Figure 6:
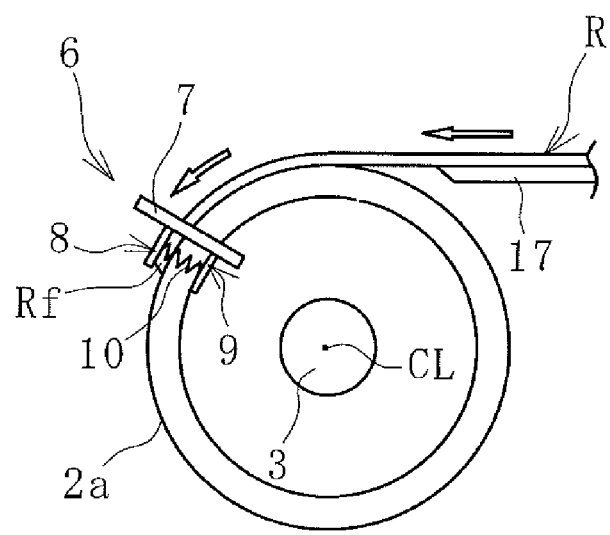
FIG. 6 is an explanatory diagram illustrating the band-like rubber member being wound around the forming drum of FIG. 5 in a side view.

Next, as illustrated in FIG. 6, the drum shaft 3 is rotationally driven, and the holding unit 6 is rotated about the drum shaft 3 together with the forming drum 2. The forming drum 2 rotates to wind the band-like rubber member R around the outer circumferential surface 2a. When the forming drum 2 rotates once, as illustrated in FIG. 7, the first end portion Rf and a second end portion Rb of the band-like rubber member R are joined together on the outer circumferential surface 2a and a cylindrical body C is manufactured.

Because the holding unit 6 is also rotated together with the forming drum 2, the first end portion Rf of the band-like rubber member R is held in a fixed state by the holding unit 6 on the outer circumferential surface 2a at a predetermined position. Centrifugal force directed radially outward acts on the first end portion Rf due to the rotation of the forming drum 2. However, the first end portion Rf is pressed by the arm 8 on the surface, preventing the first end portion Rf from peeling off from the outer circumferential surface 2a. That is, since the first end portion Rf is constantly held and fixed on the outer circumferential surface 2 at a predetermined position by the arm 8, the first end portion Rf can be joined to the second end portion Rb with minimal deviation.

Figure 8:
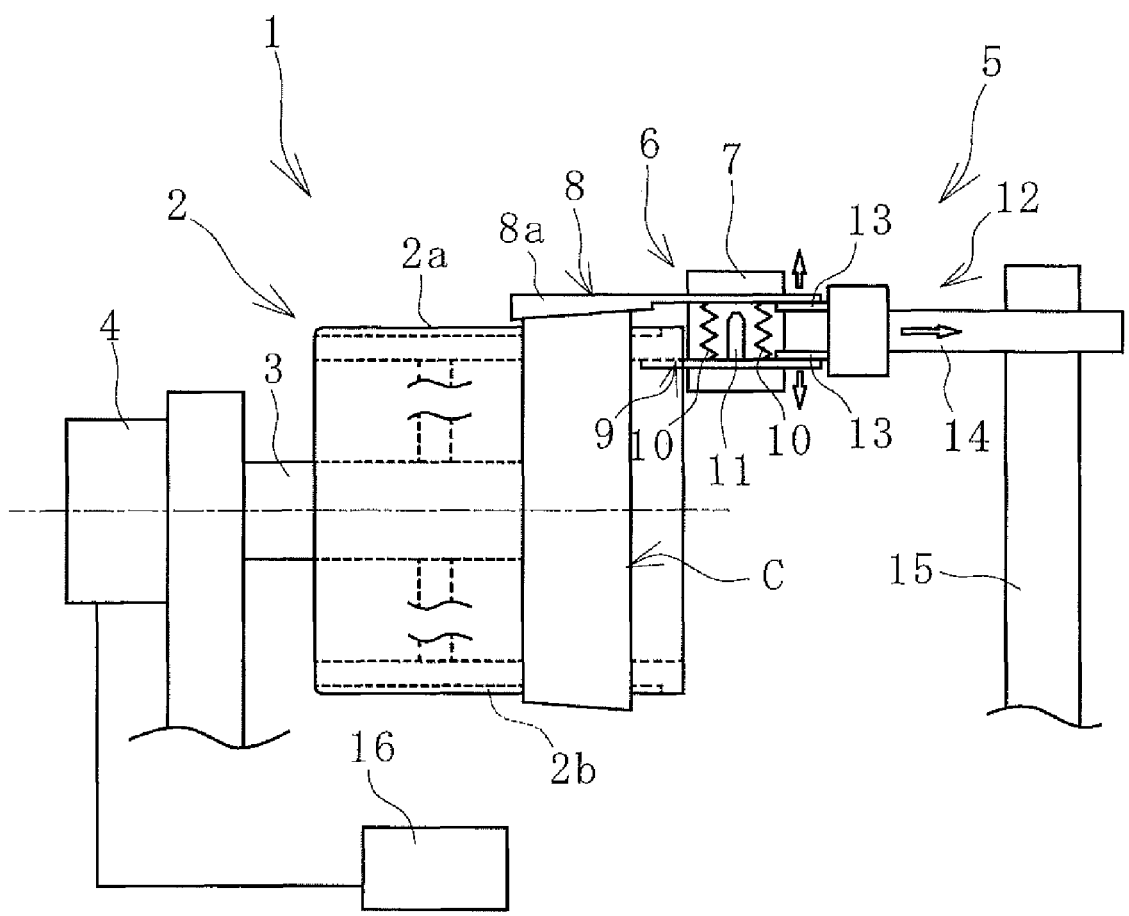
FIG. 8 is an explanatory diagram illustrating a process of removing the holding unit from the forming drum in a front view.

After manufacturing the cylindrical body C, the engagement portions 13 are moved toward the holding unit 6 attached to the forming drum 2 by the advancing/withdrawing mechanism 14. As illustrated in FIG. 8, the engagement portions 13 are inserted between the arm 8 and the projection portion 9 and moved in the direction away from one another. In this way, the arm 8 and the projection portion 9 are moved in the direction away from one another, the pressure on the first end portion Rf from the arm 8 is released, and the holding unit 6 is engaged with the engagement portion 13.

Next, the holding unit 6 is withdrawn by the advancing/withdrawing mechanism 14 and moved away from the forming drum 2. In this way, the holding unit 6 is returned to the standby position illustrated in FIG. 1. The cylindrical body C is formed on the outer circumferential surface 2a of the forming drum 2.

Even when a forming drum 2 is provided with various mechanisms and parts, and there is no space for providing a new mechanism, the holder 5 can be provided adjacent to the forming drum 2 since it is a separate body from the forming drum 2. Thus, even in the case of the forming drum 2 including the shaping bladder 2b on the outer circumferential surface 2a, the holder 5 can be employed to hold and fix the first end portion Rf of the band-like rubber member R on the outer circumferential surface 2a at a predetermined position.

When a plurality of the forming drums 2 are pivotably provided, and the forming drums 2 are successively moved through a process of forming the cylindrical member C and a process of removing the cylindrical member C from the forming drum 2, the cylindrical members C can be continuously manufactured. In such a manufacturing line, the cost required to install a mechanism for holding and fixing the band-like rubber member R on the outer circumferential surface 2a on each of the forming drums 2 is great. However, according to the present technology, only one holder 5 is required for the plurality of forming drum 2, allowing for the equipment cost to be greatly reduced.

According to the present technology as described above, even for forming drums 2 having different specifications, the first end portion Rf of the band-like rubber member R can be securely fixed on the outer circumferential surface 2a at a predetermined position by the arm 8.

In this embodiment, the stopper 11 is disposed between the arm 8 and the projection portion 9. Thus, the preset minimum separation distance between the two is ensured. Accordingly, the first end portion Rf is not pressed with excessive force by the arm 8, allowing for unintended deformation of the first end portion Rf to be prevented. In other words, by adjusting the length of the stopper 11, the pressure on the first end portion Rf from the arm 8 can be appropriately set.

For the approach mechanism 10, using a biasing member that biases the arm 8 and the projection portion 9 in a direction in which the separation distance is reduced is greatly advantageous in that the mechanism can be simplified. Additionally, the first end portion Rf disposed between the arm 8 and the projection portion 9 is constantly pressed by the arm 8. This further suppresses deviation from a predetermined position on the outer circumferential surface 2a of the forming drum 2.

In this embodiment, a contact surface where an arm 8 presses on the first end portion Rf is formed in the same shape as the pressed surface shape of the first end portion Rf. That is, when the arm 8 comes into contact with the first end portion Rf disposed on the outer circumferential surface 2a, the contact surface of the arm 8 has a shape (inclined or ridged/grooved shape) similar to the surface shape of the first end portion Rf so that the entire contact surface of the arm 8 comes into contact with the surface of the first end portion Rf at even surface pressure. Thus, local deformation of the first end portion Rf due to the pressing of the arm 8 can be suppressed.

Figure 9:
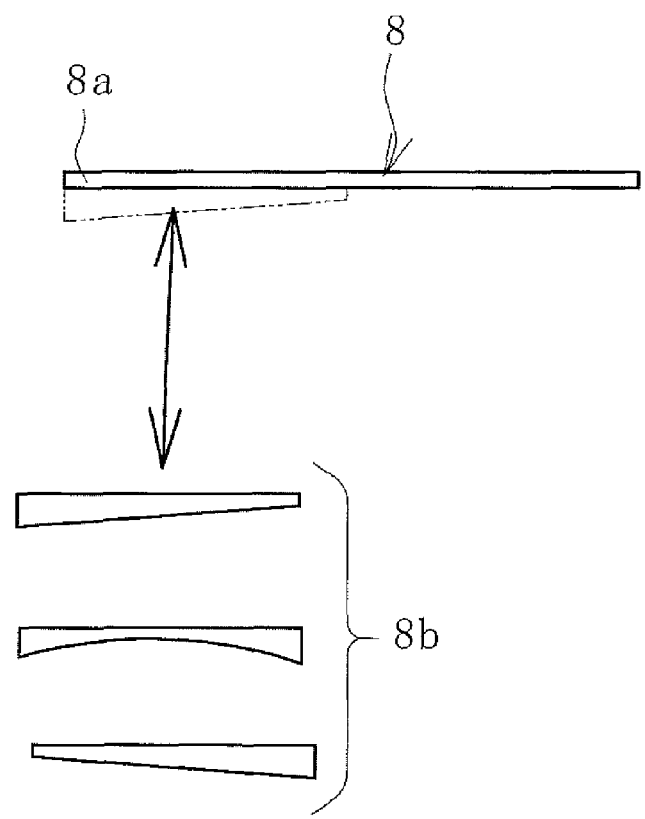
FIG. 9 is an explanatory diagram illustrating an arm according to a modified example.

Alternatively, as illustrated in FIG. 9, an attachment 8b that can be attached to and detached from the arm 8 can be provided. The attachment 8b is formed in the same shape as the surface shape of the first end portion Rf of the band-like rubber member R pressed by the arm 8. By preparing attachments 8b corresponding to the surface shapes of various band-like rubber members R, the necessary attachment 8b may be attached to the arm 8 and used at any time.

The invention claimed is:

1. A device for manufacturing a cylindrical member, comprising:
    a forming drum comprising an outer circumferential surface around which an unvulcanized band-like rubber member is wound; and
    a holder comprising a holding unit, the holding unit holding a first end portion of the band-like rubber member that corresponds to a winding starting point on the outer circumferential surface and is detachable from the forming drum; wherein
    the device has an advancing/withdrawing mechanism which moves the holding unit toward and away from the forming drum, and the holding unit is detachable with respect to the advancing/withdrawing mechanism;
    the holding unit comprises an arm and a projection portion disposed opposite one another and an approach mechanism that brings the arm and the projection portion closer together;
    when the holding unit is attached to the forming drum, an edge portion of the forming drum on one side in a width direction is inserted between the arm and the projection portion, by moving the holding unit toward the forming drum by the advancing/withdrawing mechanism, the first end portion disposed on the outer circumferential surface is disposed between the arm and the projection portion brought closer together in a direction in which a separation distance is reduced, and the first end portion is pressed by the arm and held on the outer circumferential surface; and
    the holding unit, removed from the advancing/withdrawing mechanism, is rotatable about a drum shaft together with the forming drum.

2. The device for manufacturing a cylindrical member according to claim 1, further comprising a stopper disposed between the arm and the projection portion that ensures a preset minimum separation distance between the arm and the projection portion.

3. The device for manufacturing a cylindrical member according to claim 2, wherein the approach mechanism is a biasing member that constantly biases the arm and the projection portion in a direction in which separation distance is reduced.

4. The device for manufacturing a cylindrical member according to claim 3, wherein the forming drum comprises an expanding shaping bladder on the outer circumferential surface.

5. The device for manufacturing a cylindrical member according to claim 4, wherein
    a contact surface where the arm presses the first end portion is formed in an identical shape to a surface shape of the pressed first end portion or is a detachable attachment formed in an identical shape to a surface shape of the pressed first end portion.

6. The device for manufacturing a cylindrical member according to claim 1, wherein the approach mechanism is a biasing member that constantly biases the arm and the projection portion in a direction in which separation distance is reduced.

7. The device for manufacturing a cylindrical member according to claim 1, wherein the forming drum comprises an expanding shaping bladder on the outer circumferential surface.

8. The device for manufacturing a cylindrical member according to claim 1, wherein
    a contact surface where the arm presses the first end portion is formed in an identical shape to a surface shape of the pressed first end portion or is a detachable attachment formed in an identical shape to a surface shape of the pressed first end portion.

9. A method for manufacturing a cylindrical member, comprising:
    holding a first end portion of an unvulcanized band-like rubber member corresponding to a winding starting point on an outer circumferential surface of a forming drum by attaching a holding unit to the forming drum, the holding unit detachable from the forming drum;
    winding the band-like rubber member around the outer circumferential surface and forming the band-like rubber member into a cylindrical shape by rotating the forming drum, with the first end portion held; wherein
    by inserting an edge portion of the forming drum on one side in a width direction between an arm and a projection portion of the holding unit disposed opposite one another by attaching the holding unit to an advancing/withdrawing mechanism which moves toward and away from the forming drum, and by moving the holding unit toward the forming drum by the advancing/withdrawing mechanism and by bringing the arm and the projection portion closer together in a direction in which a separation distance is reduced, the first end portion disposed on the outer circumferential surface is pressed by the arm and held on the outer circumferential surface, and the holding unit is attached to the forming drum; and
    the holding unit, removed from the advancing/withdrawing mechanism, is rotated about a drum shaft together with the forming drum.

* * * * *